UNITED STATES PATENT OFFICE.

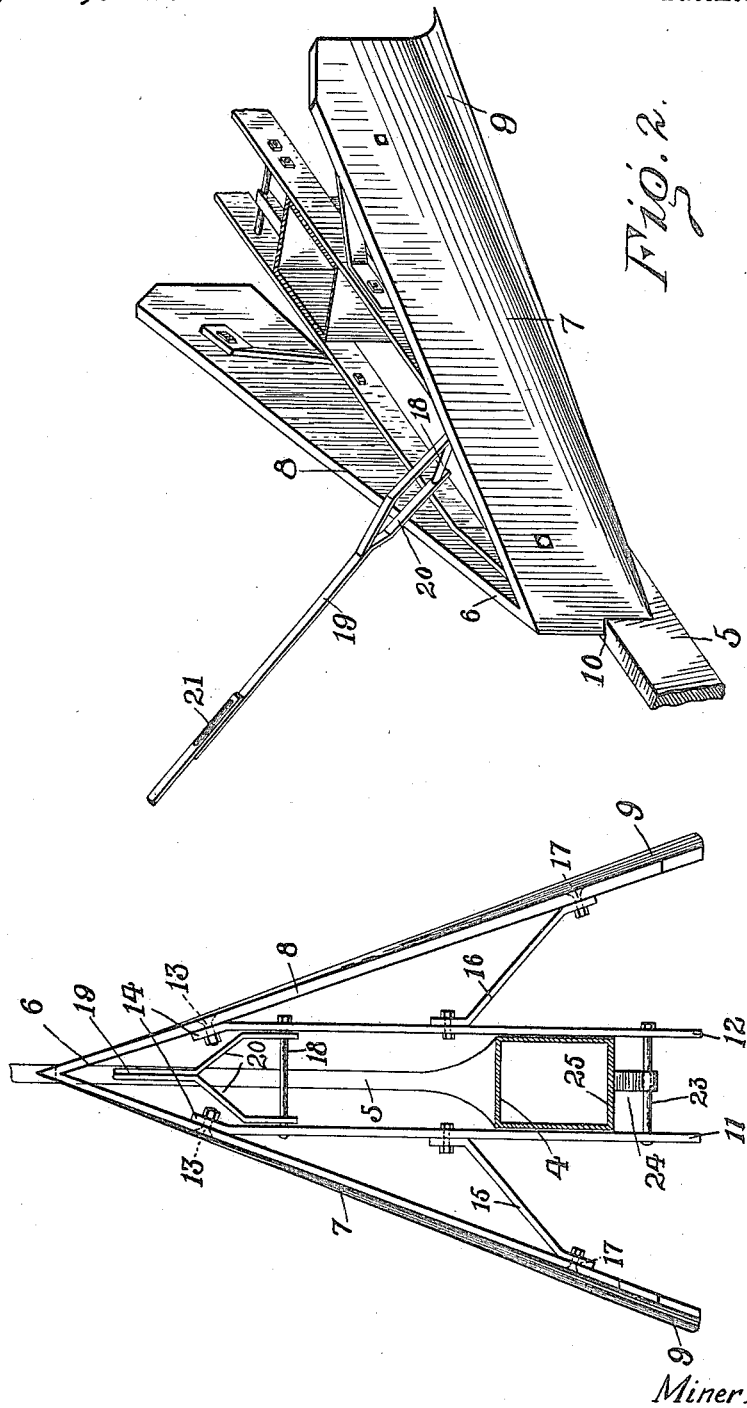

MINER H. BRUNINGA, OF MACOMB, ILLINOIS.

PLANTER-HEEL ATTACHMENT.

1,231,701.  Specification of Letters Patent.  Patented July 3, 1917.

Application filed June 28, 1916. Serial No. 106,434.

*To all whom it may concern:*

Be it known that I, MINER H. BRUNINGA, a citizen of the United States, and resident of Macomb, in the county of McDonough and State of Illinois, have invented certain new and useful Improvements in Planter-Heel Attachments, of which the following is a specification.

The present invention relates to seeders and planters and more particularly to new and useful improvements in earth leveling devices for detachable association with a planter.

The primary object of my invention is to provide a ground engaging element for use in connection with a planter heel for removing hills and for filling low places. The device also clears away trash and other obstruction insuring planting of seed an even depth.

Another object of my invention is to provide a planter attachment of the class described which may be quickly and easily attached to any of the standard types of planters without altering the construction of the planter heel. The device is also adjustable when applied to a planter heel whereby to permit application of the device to various sizes of heels.

Other objects and advantages to be derived from the use of my improved planter heel attachment will appear from the following detail description and the claims, taken with an inspection of the accompanying drawings, in which:

Figure 1 is a top plan view of the planter attachment of my invention; and

Fig. 2 is a perspective view of the planter attachment, showing the same applied, the heel being shown in section.

Referring more particularly to the drawings, wherein similar characters of reference designate like and corresponding parts throughout the various views, 4 designates the heel from which the shoe 5 extends of a planter of any conventional type.

My invention includes the body portion 6 composed of divergent blades 7 and 8 having the lower edges thereof outwardly curved as at 9. At the vertex of the blades 7 and 8 a recess 10 is formed for engagement over the shoe 5.

A pair of bars designated 11 and 12 are connected at their forward end portions with the blades 7 and 8 by means of counter-sunk bolts 13, the front ends of said bars being laterally bent as at 14 to accommodate the interior faces of the blades. The intermediate portions of the bars 11 and 12 are connected to the blades 7 and 8 adjacent the rear end portion of the latter by means of diagonal brace bars 15 and 16, counter-sunk bolts 17 serving to connect the rear free ends of said brace bars to the blades 7 and 8.

A bolt 18 extends transversely of the bars 11 and 12 adjacent the forward ends thereof, an adjusting link member 19 having spaced arms 20 on the free ends thereof being in connection with said bolts by virtue of said arms. The link member 19 is formed in two sections jointed for adjustment as indicated at 21, the upper free end of said link member being connected with the tongue of the planter. In various types of planters the link member is connected at different points, but the adjustable feature of the same permits application of the attachment of my invention to any of the existing types of planters regardless of size or construction.

A bolt 23 extends transversely of the bars 11 and 12 adjacent the rear ends thereof, said bolt extending through the apertured extension 24 of a brace member 25, said brace member being engaged with the heel of the planter drill whereby the body is allowed to swing vertically upon adjustment of the link 19.

In use, the device of my invention is applied to a planter as shown in Figs. 1 and 2. It will be seen that the position of the device of my invention is such that the lower edges of the blades 7 and 8 engage the surface of the ground while the shoe 5 penetrates the ground for the planting operation. Thus, it will be seen that all unevenness in the ground adjacent the path of travel of the planter will be removed by said blades.

Of course, I do not limit myself to the exact arrangement of the device on the planter, in view of the fact that the leveler may be applied in any position on the planter in which the desired result may be obtained.

From the above description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention what I claim as new and desire to secure by Letters Patent, is:

1. The combination of a planter including a shoe and heel, of a scraper comprising a pair of diverging blades with their vertex positioned on said shoe, a pair of parallel bars between said blade connecting the front ends of the same and the heel, and an adjustable link member connecting the planter and scraper.

2. The combination of a planter including a shoe and heel, of a scraper comprising a pair of diverging blades with their vertex positioned on said shoe, a pair of parallel bars positioned between said blades, said bars having one end secured to the front of the blades, a pivoted connection between the other end of the bars and of the heel, and an adjustable link member connecting the front ends of the scraper and the planter.

3. The combination of a planter including a shoe and heel, of a scraper comprising a pair of diverging blades with their vertex positioned on said shoe, a pair of parallel bars having their front ends secured to the inner wall of said blades adjacent their converged extremities, a pair of transverse bolts connecting the bars adjacent their opposite ends respectively, an extension on the heel pivotally connected with said rear bar whereby the bars and blades are adapted to swing vertically, and an adjustable link member connecting the said bolt with said planter.

4. A scraper for planters comprising a body formed of divergent blades with their vertex adapted to be positioned on the planter's shoe, a pair of parallel bars between said blades, one end of said bars being secured to the front portion of the blades, a transverse bolt connecting the rear ends of the bars, an extension adapted to be secured on the rear wall of the planter's heel and loosely engaging said bolt, braces between the bars and the rear ends of the blades, and an upwardly extending adjustable link member connecting the front ends of the bars and the planter.

In testimony whereof, I affix my signature hereto.

MINER H. BRUNINGA.

Copies of this patent may be obtained for five cents each, by addressing the "Commissioner of Patents. Washington, D. C."